United States Patent Office 2,799,578
Patented July 16, 1957

2,799,578

CORK ASBESTOS ELASTOMER SHEET

Stephen M. Lillis and John C. Toman, Chicago, Ill., assignors to Victor Manufacturing & Gasket Co., Chicago, Ill., a corporation of Illinois No Drawing. Application August 28, 1953,
Serial No. 377,256

1 Claim. (Cl. 92—3)

This invention relates to fibrous compositions for forming gaskets and has for its principal object the provision of a new and improved composition of this kind.

It is a main object of the invention to provide a fibrous gasket material having the characteristics of high compressibility and recovery, capability to withstand high temperatures, and imperviousness to oil, greases and coolants.

Another object of the invention is to provide a fibrous gasket material composed of asbestos, cork, and an elastomer.

Another object of the invention is to provide a composition of asbestos, cork, and an elastomer that can be formed upon a wet lap cylinder paper making machine into fibrous sheets from which gaskets can be cut.

Another object of the invention is to provide a gasket material that can be manufactured at low cost without sacrificing quality.

Further objects of the invention not specifically mentioned here will be apparent from the description and claim which follow.

Many parts of internal combustion engines, such as crankcase pans, rocker arm covers and valve covers, are manufactured of relatively thin metal and must be tightly sealed against the parts with which they are registered with relatively low sealing pressures. Gaskets made of cork have functioned well for these purposes because the compressibility and recovery characteristics of cork permitted the formation of fluid tight seals by application of relatively low pressures between the parts.

With the advent of high compression engines and pressurized cooling systems, crankcase oils are raised to higher temperatures than formerly, temperatures which have a deleterious effect upon cork, with the result that a better gasketing material capable of withstanding higher temperatures is highly desirous, if not absolutely necessary.

For a number of years, gasketing material has been made by combining with asbestos fibers an elastomer binder which is impervious to oils, greases and coolants, and is capable of withstanding the temperatures now encountered. Such materials are, however, relatively incompressible when compared with cork, and consequently higher sealing pressures are required to form a fluid tight seal between the engine parts. This fact eliminates gaskets composed of such material from use in the sealing of crankcase pans, rocker arm covers and valve covers wherein, because of the light gauge metals used, it is difficult to establish and maintain sealing pressures high enough to form a satisfactory seal.

In the prior art of which we are aware, are numerous materials formed of asbestos fibers and elastomer and cork, in effort to secure a greater compressibility and recovery while maintaining the temperature and impervious characteristics of asbestos and elastomer.

Cork, one of the lightest of natural materials having a specific gravity of from .15 to .20, contains a myriad of microscopic air-filled cells which aggregate more than 50% of the volume of the cork. It is because of these air cells that the characteristics of low gravity, high compressibility and recovery, low thermal conductivity and low fluid adsorption because of lack of capillarity, are obtained.

Merely grinding cork to fine particle size and incorporating the ground material in the mix from which the fibrous sheet is made presents problems. If the particle size is small, as in the range of 200 mesh, as in the case of certain prior art compositions of which we are aware, much of the resiliency of the cork is lost through the destruction of the microscopic air cells, and cork in the composition serves mainly, if not entirely, as an organic filler. Gaskets made from such material show virtually no improvement in the characteristics of compressibility and recovery. On the other hand, attempts to incorporate large particle size cork into such compositions present the difficulty of even distribution of cork particles throughout the sheet because of the tendency of cork to float to the top of the slurry from which the sheet is made. To form a gasketing material in which the distribution of cork particles is uneven, obviously cannot result in a satisfactory gasket since it would be highly compressible at points and lack compressibility elsewhere.

The present invention seeks to form, on an ordinary wet lap cylinder paper making machine, a fibrous asbestos, cork and elastomer material in which sufficient cork is incorporated in a uniform manner to add desired compressibility and recovery characteristics to the material without unduly lowering the ability of the material to withstand high temperatures.

To accomplish this end, we prefer to employ cork ground to such a particle size as to pass through a 40-mesh screen and to be retained upon a 50-mesh screen, that is, to employ ground cork having a minimum particle size of 50 mesh. In the mixing of the ingredients from which our improved material is made, sufficient wetting agent is employed to adequately wet the cork particles thereby to maintain them suspended within the slurry delivered to the cylinder of the machine, with the result that these cork particles are distributed through the sheet in a very uniform manner and the physical characteristics of the sheet so formed render it satisfactory for use as a gasketing material where low pressures and high temperatures are involved. While the presence of cork in the composition lowers the temperature characteristics of the composition, since cork is less capable of withstanding high temperatures than are the asbestos and elastomer ingredients, proper proportioning of the ingredients results in a fibrous sheet material having temperature characteristics satisfactory for the uses intended.

In the preparation of a preferred form of our improved composition, 450 gallons of water are placed in the beater of a paper making machine, and 175 pounds of virgin asbestos fiber and 25 pounds of refiberized scrap asbestos material, together with 100 pounds of cork ground to 50-mesh minimum, are added. The beater is started and 2 pounds of sodium hexametaphosphate are added to soften the water and thereby aid in thoroughly wetting the asbestos fibers and cork. Ordinarily this preliminary beating operation is continued for about five minutes.

Sixty (60) pounds of a curative material are then added to the mix. Preferably this curative material consists of 43.2 pounds of water, 4 pounds of a curing agent such as zinc oxide, .8 of a pound of an accelerator such as sulfur, 1.6 pounds of an anti-oxidant such as phenyl-beta-naphthylamine, 8 pounds of a filler such as easy processing channel carbon black, .8 of a pound of a wetting agent such as aralkyl polyether alcohol, .8 of a pound of a filler and stabilizer such as bentonite, and .8 of a pound of accelerator such as thiocarbanilide. This blend of materials is allowed to mix for an additional five minutes, after which 240 pounds of neoprene latex containing 35% solids and adjusted to a pH of 8 by the addition of 5 pounds of 5% acetic acid, together with 160 pounds of a dispersing agent, preferably containing 152 pounds of water and 8 pounds of sodium alkyl aryl sulfonate, are added, together with sufficient water to bring the volume of the mix in the beater up to 900 gallons.

The beater is operated for approximately five minutes during which 34 pounds of paper maker's alum is slowly added to the mixture to aid in coagulating the rubber onto the fiber and cork. When all of the rubber has been so coagulated, the water will be clear, thereby indicating the completion of the batch.

The mixture so prepared is diluted to a slurry of proper solids content for the machine upon which it is to be formed into a sheet. In one instance a slurry of 1% solids content has been found to be satisfactory. The wet lap cylinder paper forming machine is operated to form from this slurry a sheet of the desired thickness and when that thickness has been achieved the sheet is removed, air-dried preliminarily, and then oven-dried down to a final low moisture content to complete the formation of the sheet.

In a wet lap cylinder type paper machine, the fibers in the slurry are picked up on a belt and transferred from it to the cylinder of the machine to build up on that cylinder a sheet or web of desired thickness. The fibers are laid in the sheet in strata or layers and the layers held together by the interlacing of the fibers in the layers. With the thorough wetting of the cork particles, achieved through the above formula, the tendency of the particles to float to the top of the slurry is minimized to such an extent that with the proportions of cork particles employed the distribution of those particles in the sheet is sufficiently uniform to render the sheet entirely satisfactory for the purposes intended. Thus we are able to obtain the advantages in compressibility and recovery resulting from the use of larger particles of cork without sacrificing uniformity of distribution of those particles in the sheet.

Gaskets formed from such material, when tested in accordance with the American Society for Testing Materials specifications D-1147-51T and D-1170-51T, have been found to have a tensile strength of 500 pounds to the square inch, a compressibility of 35% plus or minus 5%, and a recovery of 40% minimum. The prior art composition of asbestos and neoprene, when tested under the same conditions, has a tensile strength of 1000 pounds to the square inch, a compressibility of 25% plus or minus 5%, and a minimum recovery of 40%. Thus it will be seen that through the sacrifice of 500 pounds of tensile strength, a gain of 40% over the compressibility is achieved by the addition of the cork. Recovery which amounts to 40% of the compressibility is likewise substantially increased by the addition of the cork, although percentagewise it remains unchanged. This recovery compares favorably with that of cork composition.

Temperaturewise our new composition shows substantial improvement over cork. Under continuous operation our asbestos cork neoprene composition will withstand 300° F. without deterioration and for intermittent service 350° F. This compares favorably with the 300° F. continuous rating of the asbestos neoprene composition and with its 400° F. intermittent rating. For even higher temperatures, polyacrylates elastomer may be used to raise the temperature characteristic to 350° F. in continuous operation and 500° F. in intermittent operation. While such temperatures are below those which the polyacrylate rubber is capable of withstanding, that is to be expected, since cork of itself is wholly incapable of withstanding such temperatures and its inclusion in the mixture must necessarily lower the maximum temperature to which the material may safely be subjected.

Our improved material is impervious to oils, greases and coolants to the same degree as are prior asbestos neoprene compositions and is entirely satisfactory for the purposes intended. The cost of manufacture is low.

While we have illustrated our composition by describing a preferred embodiment of it, we have done so by way of example only, as there are many modifications which can be made by one skilled in the art within the teachings of the invention.

Having thus complied with the statutes by describing a preferred embodiment of our invention, what we consider new and desire to have protected by Letters Patent is pointed out in the appended claim.

What is claimed is:

A fibrous sheet of material suitable for use in the formation of gaskets and containing the residue after drying from a slurry formed with 175 pounds of virgin asbestos fiber, 25 pounds of refiberized scrap asbestos, 100 pounds of ground cork of 50 mesh minimum particle size, 2 pounds of sodium hexametaphosphate, 4 pounds of zinc oxide, .8 pound of sulfur, 1.6 pounds of phenyl-beta-naphthylamine, 8 pounds of carbon black, .8 pound of aralkyl polyether alcohol, .8 pound of bentonite, .8 pound of thiocarbanilide, 240 pounds of neoprene latex containing 35% solids, 5 pounds of 5% acetic acid, together with 160 pounds of dispersing agent, containing 152 pounds of water and 8 pounds of sodium alkyl aryl sulfonate, 30 pounds of paper maker's alum, together with sufficient water to effect complete coagulation of the neoprene on the fibers and to reduce the solids content of the slurry to the range of 1%, which material has a tensile strength of 500 pounds per square inch, a compressibility of 35%, and a recovery of 40% minimum, and is capable of withstanding temperatures of 300° F. in continuous service and 350° F. in intermittent service without deterioration.

References Cited in the file of this patent

UNITED STATES PATENTS

| | | |
|---|---|---|
| 1,785,357 | Levin | Dec. 16, 1930 |
| 2,550,143 | Eger | Apr. 24, 1951 |
| 2,584,959 | Yocom et al. | Feb. 5, 1952 |
| 2,613,190 | Feigley | Oct. 7, 1952 |